United States Patent
Bolland

[19]

[11] Patent Number: 5,951,448
[45] Date of Patent: Sep. 14, 1999

[54] EXERCISE MACHINE FOR LOWER AND UPPER BODY

[76] Inventor: Kevin O. Bolland, 5623 Massachusetts Ave., Bethesda, Md. 20816

[21] Appl. No.: 08/984,610

[22] Filed: Dec. 3, 1997

Related U.S. Application Data

[60] Provisional application No. 60/042,333, Mar. 21, 1997, and provisional application No. 60/044,159, Apr. 23, 1997.

[51] Int. Cl.⁶ .................................................. A63B 21/008
[52] U.S. Cl. .......................... 482/112; 482/134; 482/137
[58] Field of Search .................................. 482/51, 72, 79, 482/80, 92, 111, 112, 113, 121, 122, 123, 130, 133–137, 139, 142, 908, 97

[56] References Cited

U.S. PATENT DOCUMENTS

| | | |
|---|---|---|
| 3,587,319 | 6/1971 | Andrews . |
| 4,169,589 | 10/1979 | McArthur . |
| 4,247,098 | 1/1981 | Brenthan . |
| 4,275,882 | 6/1981 | Grosser et al. . |
| 4,429,871 | 2/1984 | Flechner ................................. 482/112 |
| 4,678,187 | 7/1987 | Prsala . |
| 4,786,051 | 11/1988 | Mullican . |
| 4,903,963 | 2/1990 | Garnett . |
| 5,031,905 | 7/1991 | Walsh . |
| 5,100,131 | 3/1992 | Fong . |
| 5,122,106 | 6/1992 | Atwood et al. . |
| 5,215,511 | 6/1993 | Cheng . |
| 5,254,067 | 10/1993 | Habing et al. . |
| 5,366,429 | 11/1994 | Jones . |
| 5,372,564 | 12/1994 | Spirito ..................................... 482/112 |
| 5,435,801 | 7/1995 | Hung ...................................... 482/130 |
| 5,492,524 | 2/1996 | Marx . |
| 5,505,679 | 4/1996 | McBride et al. . |
| 5,554,090 | 9/1996 | Jones ........................................ 482/97 |
| 5,605,524 | 2/1997 | Husted . |
| 5,746,688 | 5/1998 | Pragger .................................. 482/142 |
| 5,836,859 | 11/1998 | Van Herle .............................. 482/112 |

OTHER PUBLICATIONS

Nordiac Track 1996 Catalog, p. 33, 1996.

*Primary Examiner*—Jeanne M. Clark

[57] ABSTRACT

An exercise machine of light weight and portable construction adapted for storage in a highly compact configuration. The device can be deployed quickly and easily for use in performing a variety of different exercises routinely.

9 Claims, 11 Drawing Sheets

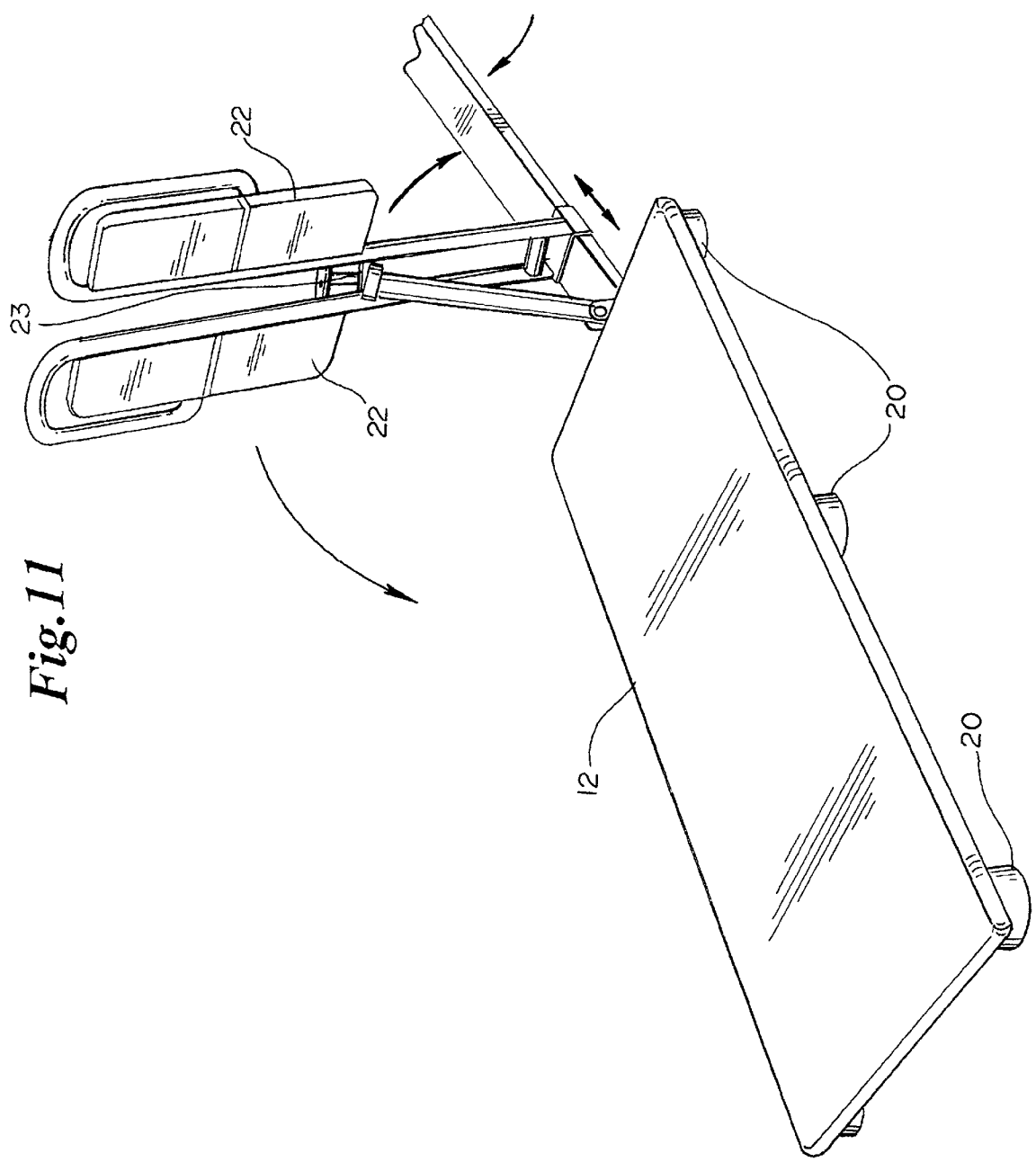

EXERCISE MACHINE FOR LOWER AND UPPER BODY

Cross Reference to Related Provisional Applications

This application claims priority on provisional application Ser. No. 60/042,333 filed on Mar. 21, 1997 and provisional application Ser. No. 60/044,159 filed on Apr. 23, 1997 and to Disclosure Document 396,847 of May 2, 1996, Disclosure Document 403,480 of Aug. 15, 1996 and Disclosure Document 407,498 of Oct. 29, 1996 and Disclosure Document 420,550 of Jun. 25, 1997 all of which were filed by the inventor hereof.

BACKGROUND OF THE INVENTION

This invention relates generally to exercise equipment. More specifically, this invention relates to an improved exercise device of light weight and portable construction adapted for storage in a highly compact configuration, wherein the device can be deployed quickly and easily for use in performing a variety of different exercise routines.

While the invention generally relates to apparatus for the exercise of various muscle groups, in its preferred embodiment it more specifically relates to an exercise to alternatively condition three sets of muscles, i.e. the buttocks, calves and thighs of the lower human torso and, in other configurations the muscles of the upper human torso.

The muscles are exercised by pivoting a lever arm away from the body against a resistance force provided by an adjustably positioned resistance device which has an adjustable resistance force and is biased to return to its initial position after the user removes the applied exercise force. In addition to providing a resistance device having an adjustable force, the invention also is adjustable to varying positions to alter both resistance force characteristics and also to accommodate size differences of multiple users.

SUMMARY OF THE INVENTION

The present invention relates generally to several specific aspects of providing conditioning to various muscle groups in both the upper and lower human torso.

It is an object of the present invention to provide apparatuses and methods of using the apparatuses which contribute numerous advantages of using the exercise device system mentioned heretofore and many novel features that result in a new and improved exercise device which is not anticipated, rendered obvious, suggested, or even implied by any prior art exercise devices, either alone or in any combinations thereof.

It is another object of the present invention to provide generally an improved exercise device of light weight and portable construction.

It is a further object of the present invention to provide an improved exercise device which can be deployed quickly and easily for use in performing a variety of exercise routines.

These together with other objects of the present invention, along, with the various other features of novelty which characterizes this invention are listed in the claims that append and form a part of this disclosure.

BRIEF DESCRIPTION OF THE DRAWINGS

FIG. 11 is a perspective view of a third embodiment of the exercise machine.

DETAILED DESCRIPTION OF THE INVENTION

Figure 9:
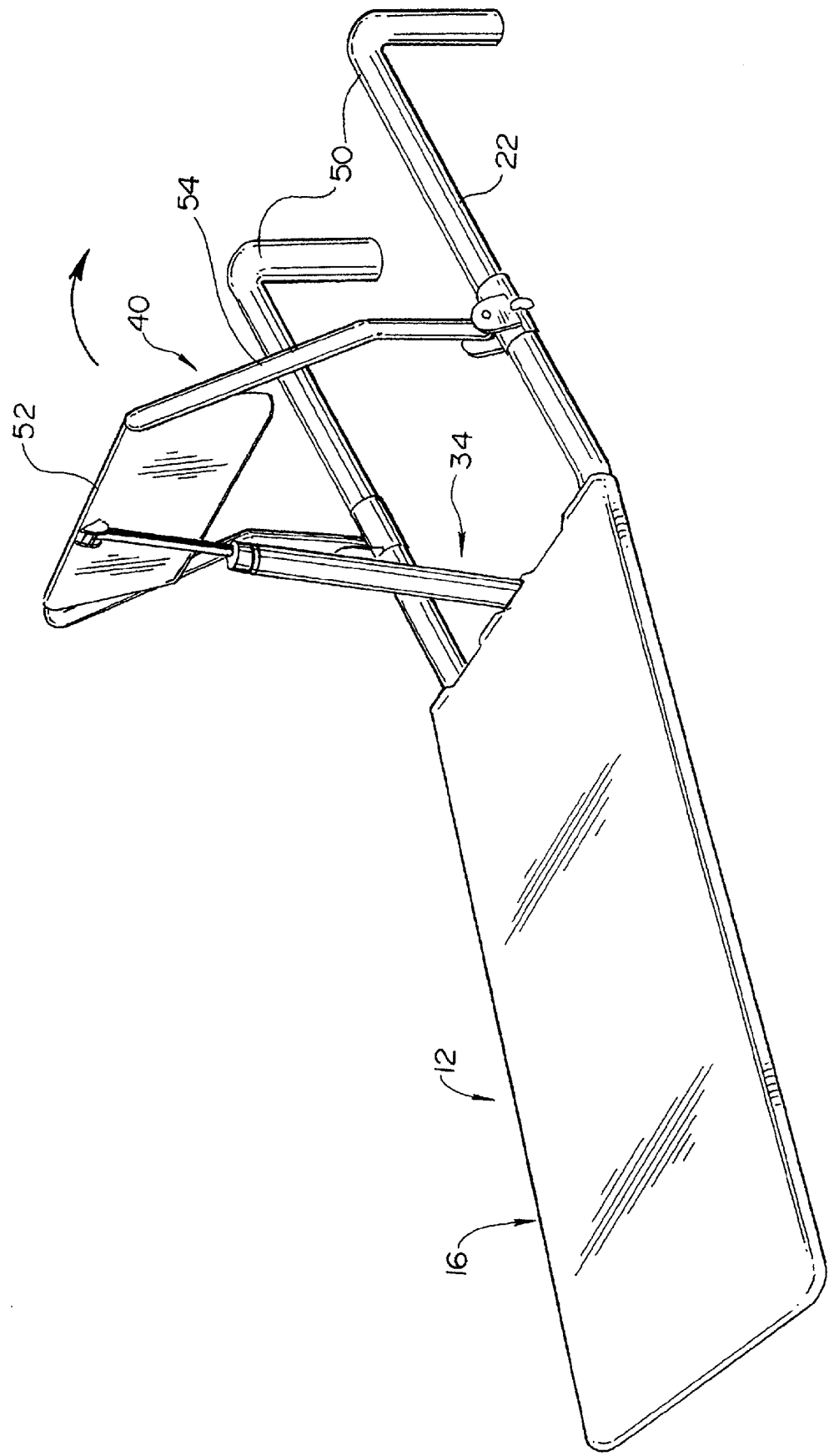
FIG. 9 is a perspective view of a second embodiment of the exercise device.
Figure 10:
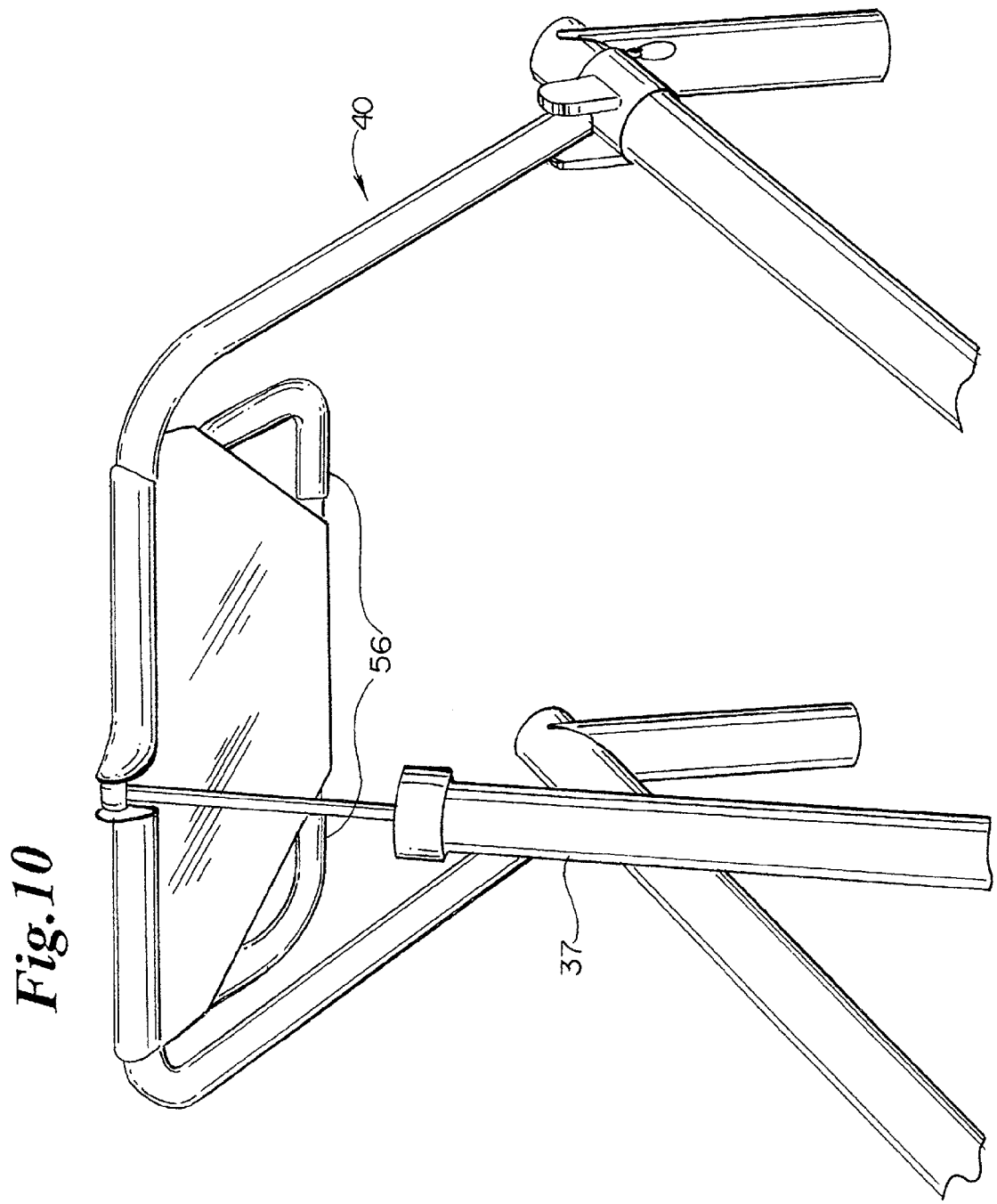
FIG. 10 is a detail view of the exercise device illustrated in FIG. 9 showing the foot pedal assembly adjusted to its other orientation.

The various aspects of the present invention are shown in the three embodiments of the exerciser disclosed in this application. The embodiment shown in FIGS. 1 through 8 is a preferred embodiment of a lower body exercise device incorporating the present invention. The two embodiments shown in FIGS. 9 through 11 are two alternative embodiments of exercise devices which can be used for performing both lower and upper body exercises such as a chest press in a kneeling position using the hand grips. Where common parts appear in the three embodiments the same reference characters used in describing them are also used in the second and third embodiments.

Figure 1:
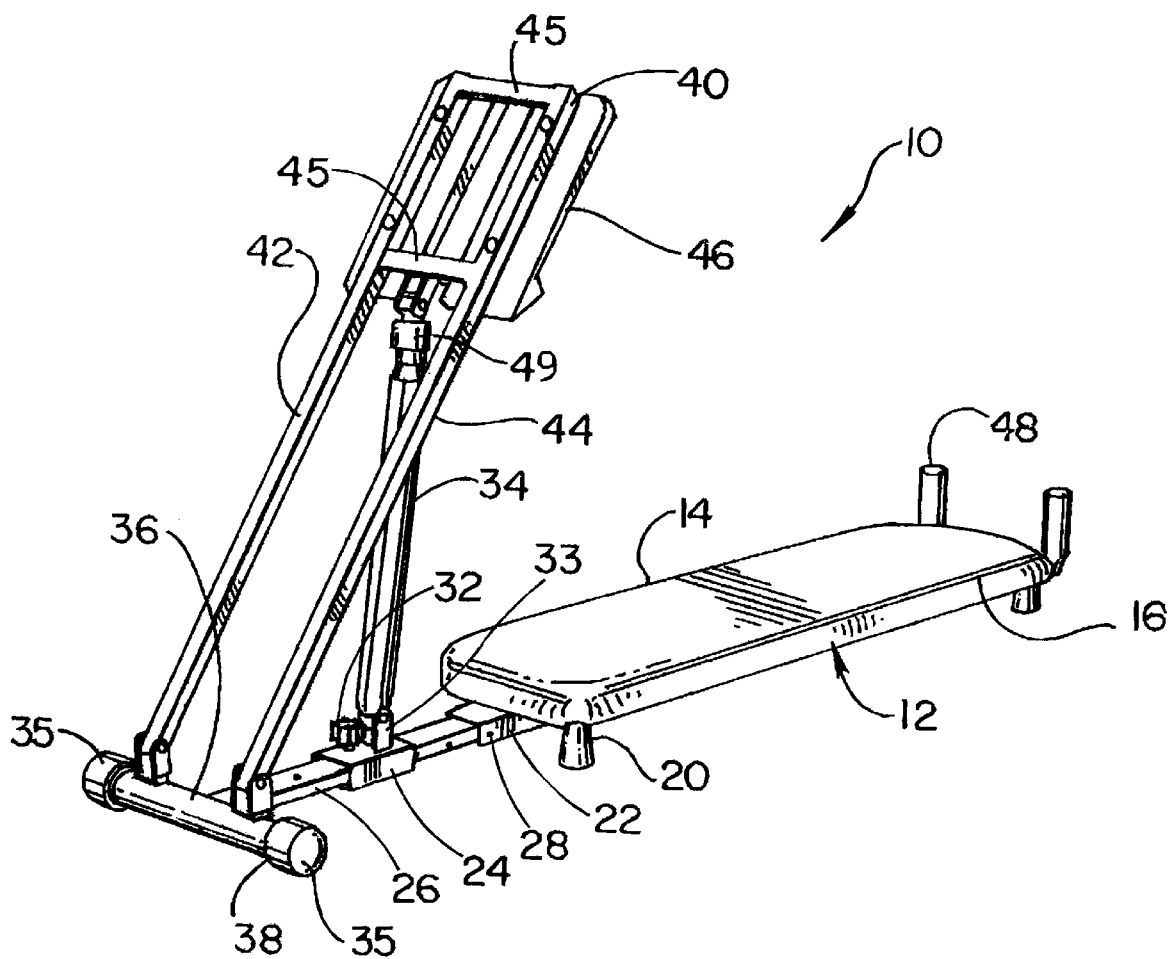
FIG. 1 is a perspective view of an embodiment of an exercise device in accordance with the present invention.

Turning now to FIG. 1, a perspective view of the preferred embodiment of an exercise device 10 incorporating the present invention is illustrated. A base pad 12 is constructed and arranged for supporting a user on its generally horizontal top surface 14. In the preferred embodiment illustrated base pad 12 comprises a rigid frame portion covered by a resilient cushion 16. Four support feet 20 are positioned at the four corners of base pad 12 to elevate it slightly above the floor, however, as few or as many support feet as are realistic to properly support the base pad 12 can be also used in the present invention.

At one end of base pad 12 one end of a leg means 22 is attached. In the preferred embodiment illustrated in FIG. 1, leg means 22, which is telescoping, is comprised of a leg receiving portion 24 which is attached to the rigid frame portion of base pad 12 so that it extends slightly beyond the one end of base pad 12. An extendable leg portion 26 is slidably received in leg receiving portion 24 and locked into a selected extension position by detent pin 28 which extends through a pin receiving aperture in leg receiving portion 24 and one of a series of adjustment holes in the body of extendable leg portion 26.

A mounting means 30 is slidably mounted on the extendable portion 26 of leg means 22 and may be locked in selected positions by an adjustable locking knob 32. A tubular resistance means 34 such as a fluid damper has one end pinned for pivotal movement in a clevis which is located on top of mounting means 30. Resistance means 34 provides a viscous damping force as the cylinder is extended that is proportional to the rate that it is being extended by force applied by the user. When the user ceases to apply force, resistance means 34 is biased by an internal spring means which smoothly returns it to the retracted starting position.

At the distal end of extendable leg portion 26, a roller means 35, which includes a first crossbar 36, is attached. A first crossbar 36 extends outwardly on both sides of leg portion 26 and is generally perpendicular to leg portion 26. A suitable roller assembly 38 comprised of a wheel, axle, and suitable bearing means is mounted at each end of a first crossbar 36 to support and stabilize that end of exercise device 10 when it is in use and to allow the folded device to be rolled away for storage as will be discussed further in connection with the description of FIG. 8 below.

A foot pedal assembly 40 includes longitudinally extending first and second frame members 42 and 44 which are each pivotally mounted at one end thereof to the first crossbar 36 of roller assembly 38.

A foot engaging pedal plate 46 is mounted to the other ends of first and second frame members 42 and 44. The other end of resistance means 34 is pivotally attached to a second crossbar 45 which links first and second frame members 42, 44, adjacent foot engaging pedal plate 46. As shown in FIG. 1 there may be two crossbars 45 provided in the region where the foot engaging pedal plate is located to strengthen device 10.

As can be seen in FIG. 1, a triangle is formed which has three components comprised of resistance means 34, extendable leg portion 26 and first and second frame members 42, 44.

When the user of device 10 lies on the pad with feet oriented toward the end from which extendable leg portion 26 projects, the user's feet, or foot, may be positioned against the engaging pedal plate 46 which then pivots away from pad 12 against the opposing frictional force of resistance means 34 as it is extended.

The resistance force opposing movement of the pedal plate 46 may be varied in several ways. In the preferred embodiment the resistance force of resistance means 34 may be varied by adjusting resistance knob 49 which is part of the commercially available resistance means or fluid viscous damper means or shock absorber which provides a resistance force which is proportional to the speed at which it is being moved and which can be varied by changing the position of resistance knob 49.

In addition to changing the resistance force by adjusting resistance means 34 itself, the shape of the triangle can be altered by operating locking knob 32 and changing the position of the connection between tubular resistance means 34 and leg means 22 to change the shape of the triangle formed by elements 34, 26 and 42, 44 thereby altering the resistance force of pedal plate 46 to its movement by the user.

A pair of hand grips 48 project from the end of base pad 12 opposite to the one from which leg means 22 projects to allow a user lying on base pad 12 on his back to maintain the upper torso stationary on pad 12 as the feet operate the foot assembly against the resistance of resistance means 34.

Figure 2A:
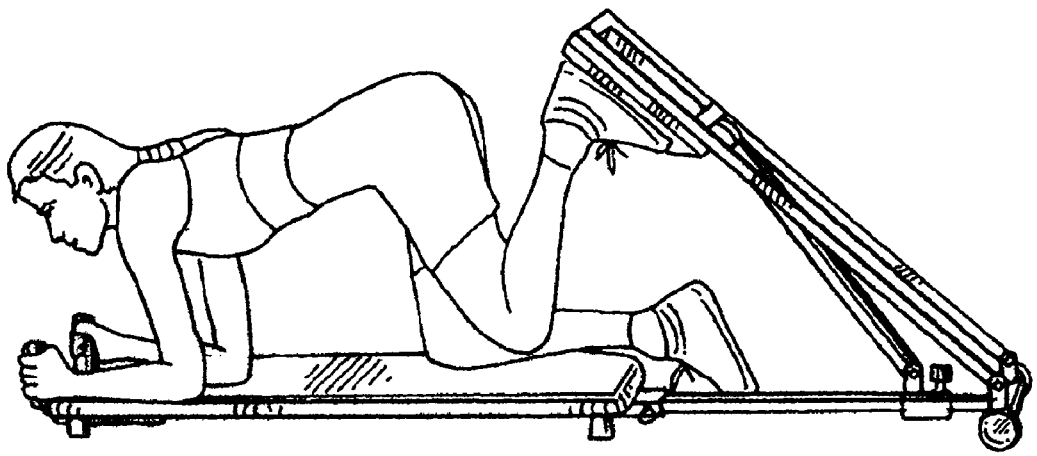
FIGS. 2A and 2B illustrate the use of the exercise device of FIG. 1 to perform a "glute press" exercise.
Figure 2B:
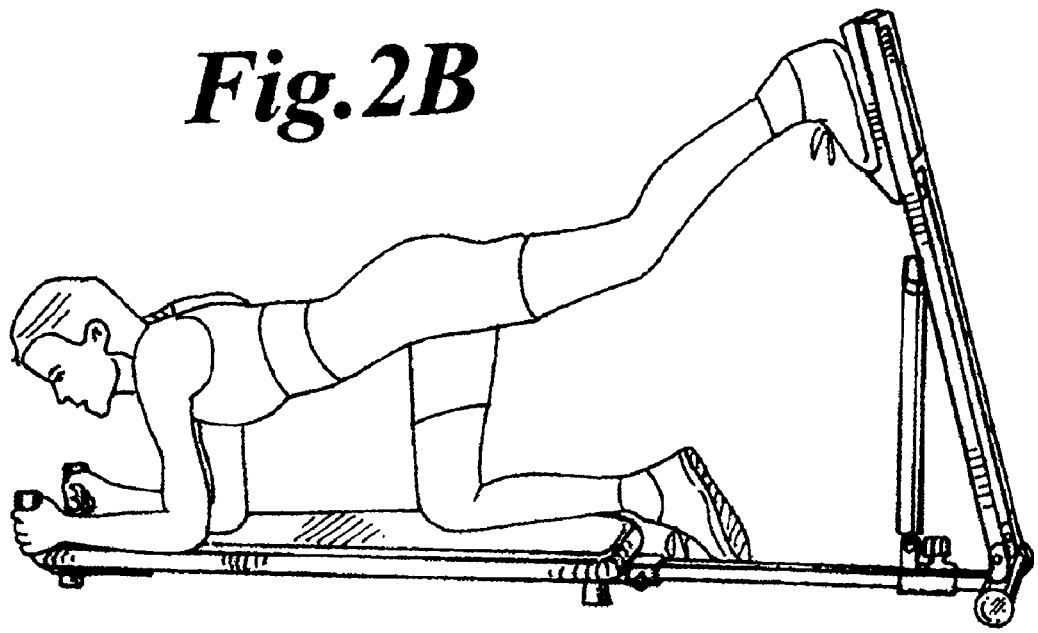

FIGS. 2A and 2B show the exercise device in use to perform the so-called "glute press" exercise. The user kneels on pad 12 with elbows also on the mat and hands gripping hand grips 48. The triangle is adjusted as shown so that the lower end of resistance means 34 is positioned closely adjacent the pivot point between frame 42, 44 and leg means 22. The user supports weight on the elbows and right knee and pushes the left heel against the foot pedal plate keeping the back straight and neck in line with the spine. The abs and glutes are held in a tightened state as the leg is extended. The position is then changed and the other leg exercised. The exercise works the gluteus, hamstrings and hip flexor muscle groups.

Figure 3A:
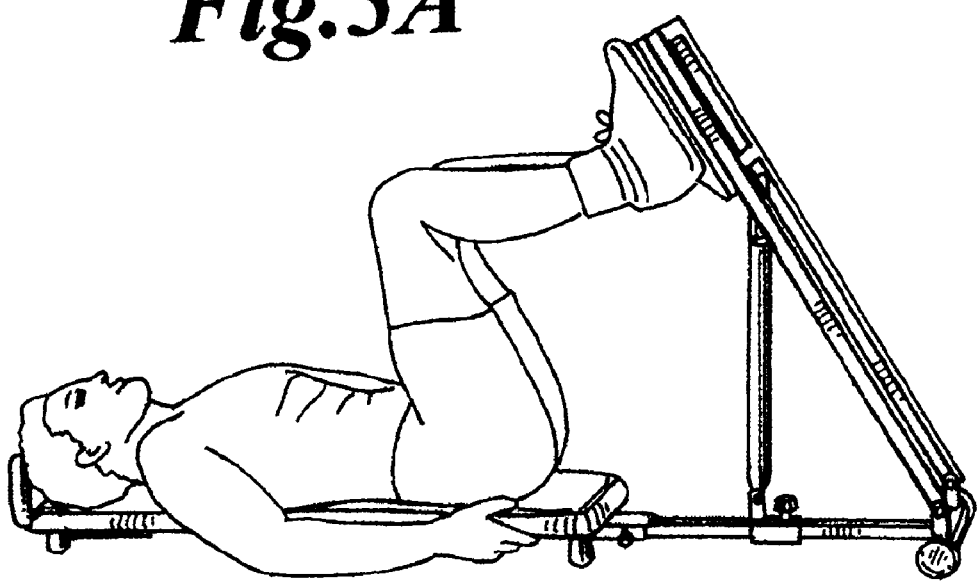
FIGS. 3A and 3B illustrate the use of the exercise device of FIG. 1 to perform a leg press exercise.
Figure 3B:
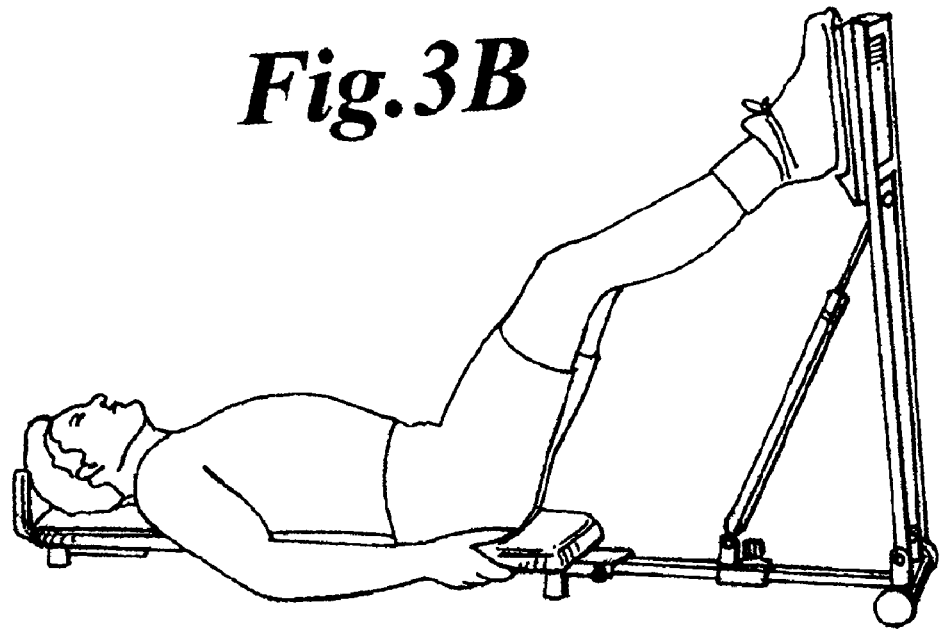

FIGS. 3A and 3B illustrate the two segments of the leg press exercise. The triangle is altered so that the resistance means begins the exercise nearly vertical as shown. The user, lying on his back extends both legs with both feet on the foot engaging pedal plates 46. The legs are extended fully without locking the knees. The device 12 may need to be adjusted to accommodate the height of the user by adjusting the extension of extendable leg portion 26. The user exhales as the legs are extended and the pedal 46 is pushed out and the back is maintained in a neutral position against pad 12 rather than arched. The exercise works the gluteus, quadriceps and hip flexor muscle groups.

Figure 4A:
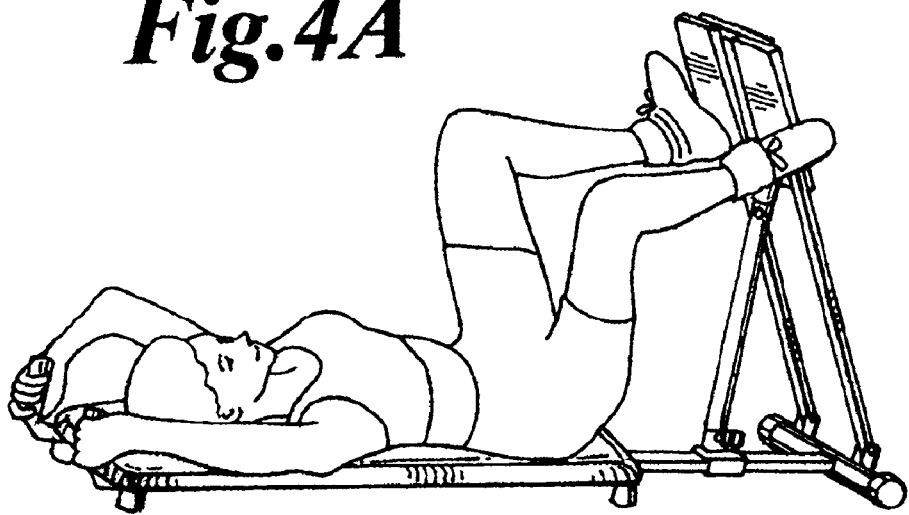
FIGS. 4A and 4B illustrate the use of the exercise device of FIG. 1 to perform a plie' press exercise.
Figure 4B:
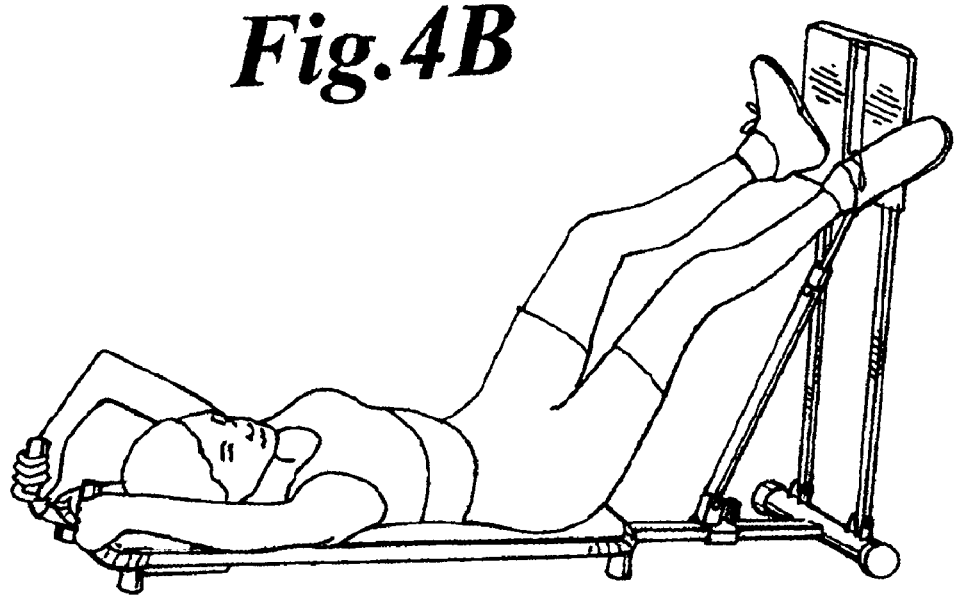

FIGS. 4A and 4B illustrate the plie press exercise positions. The triangle is set to the same shape as the prior exercise so that the resistance means starts from an initially vertical position. The user lies on her back with both hands over the head and grasping hand grips 48. The toes are turned slightly outwards and the legs are extended while pushing against the pedals 46. The legs are extended through the entire range of movement and the breath is exhaled on the pushout and inhaled on the return. The exercise works the hip abductors, gluteus, quadriceps and hip flexor muscle groups.

Figure 5A:
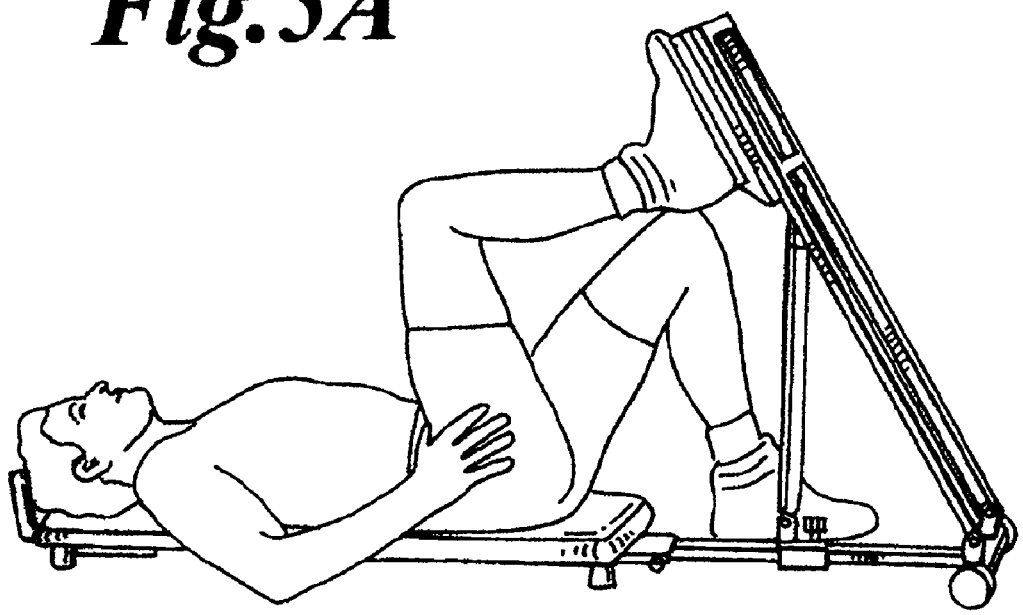
FIGS. 5A and 5B illustrate the use of the exercise device of FIG. 1 to perform a single leg press exercise.
Figure 5B:
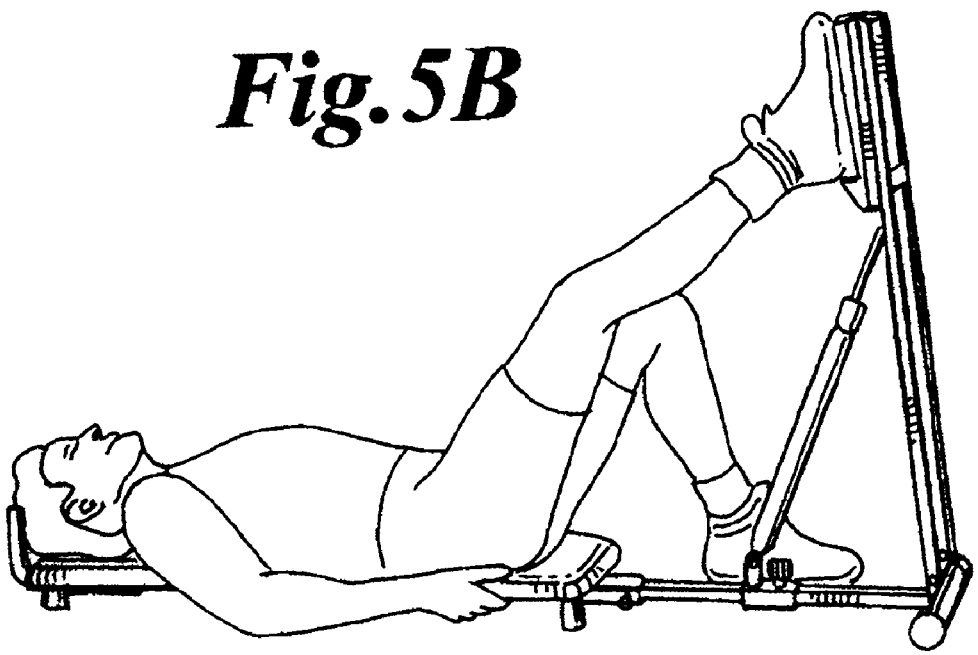

FIGS. 5A and 5B show the use of the exercise device 10 in performing the single leg press exercise. The triangle shape remains the same as it was in the prior exercise with resistance means 34 starting in the nearly vertical position. The legs are extended against the pedal plate 46 one at a time while exhaling without locking the knee. The muscle groups worked in doing the exercise are the gluteus, the quadriceps and the hip flexors.

Figure 6A:
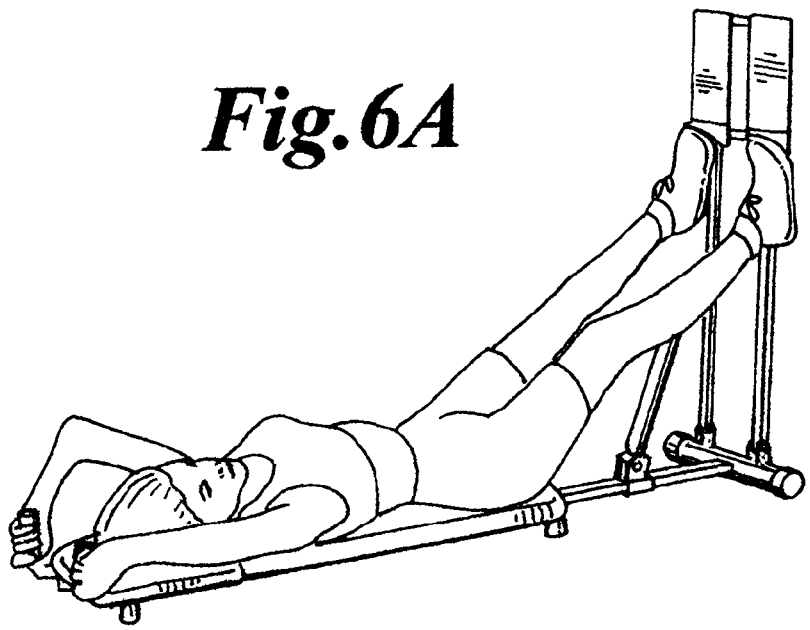
FIGS. 6A and 6B illustrate the use of the exercise device of FIG. 1 to perform a calf press.
Figure 6B:
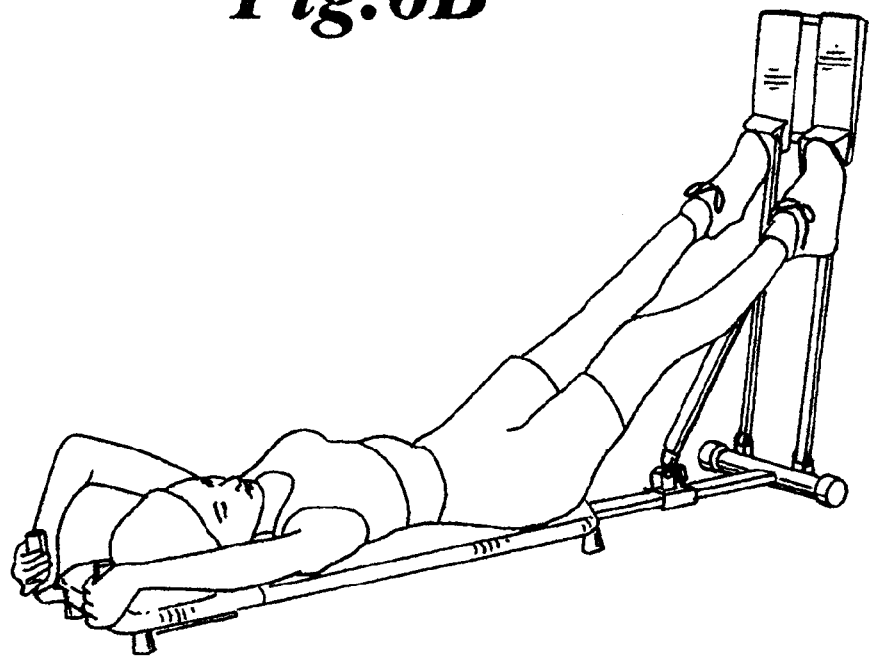

FIGS. 6A and 6B show the exercise device as it is configured for use in performing the calf press exercise. Again the basic triangle shape remains as it was adjusted in the prior exercise but the starting position is with frame members 42, 44 vertical and the lower portion of the pedal plate 46 is pressed with just the toes of both feet while the hands grasp the hand grips 48 above the head. The muscle groups worked in the course of this exercise are the gastrocnemius and the soleus.

Figure 7A:
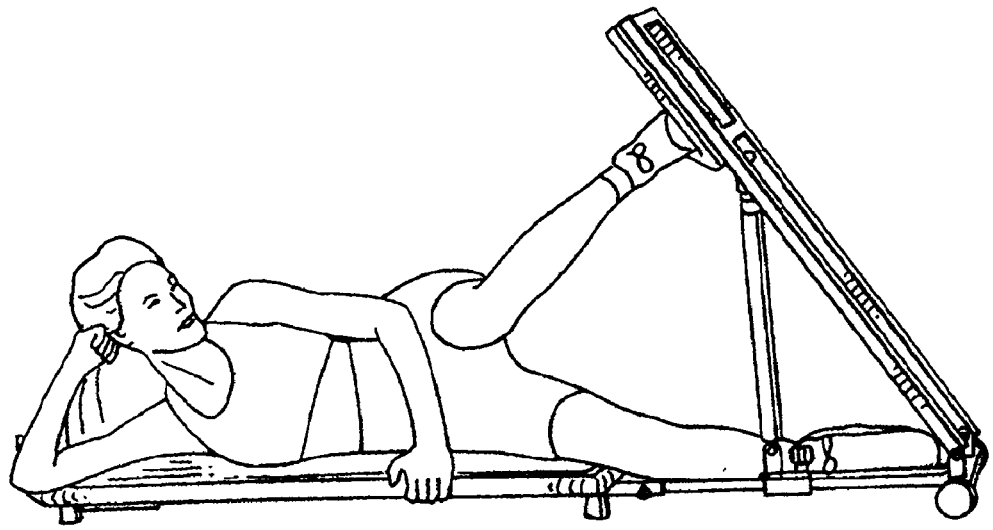
FIGS. 7A and 7B illustrate the use of the exercise device of FIG. 1 to perform a side kick exercise.
Figure 7B:
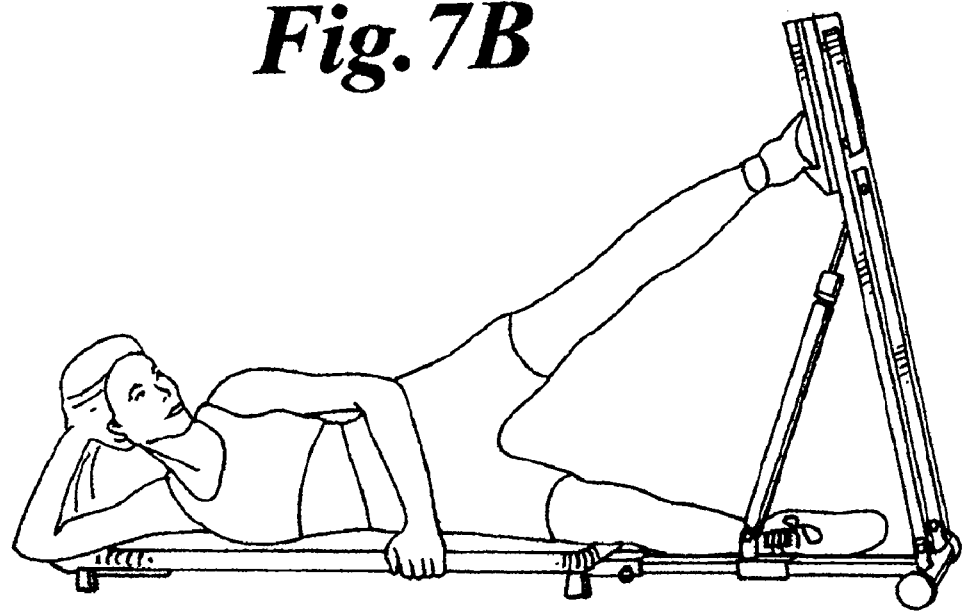

FIGS. 7A and 7B show the exercise device 10 in use to perform the side kick exercise. Again the triangle is adjusted into the position where the resistance device 34 starts in the vertical position. The user rests on one elbow, supporting the head with that arm and starts with the right leg bent with the foot behind her—away from base pad 12 and the left leg positioned with the foot across the bottom of foot pedal plate 46. This exercise works muscles in the gluteus, abdusctor, hamstring, quadriceps and hip flexor muscle groups.

Figure 8:
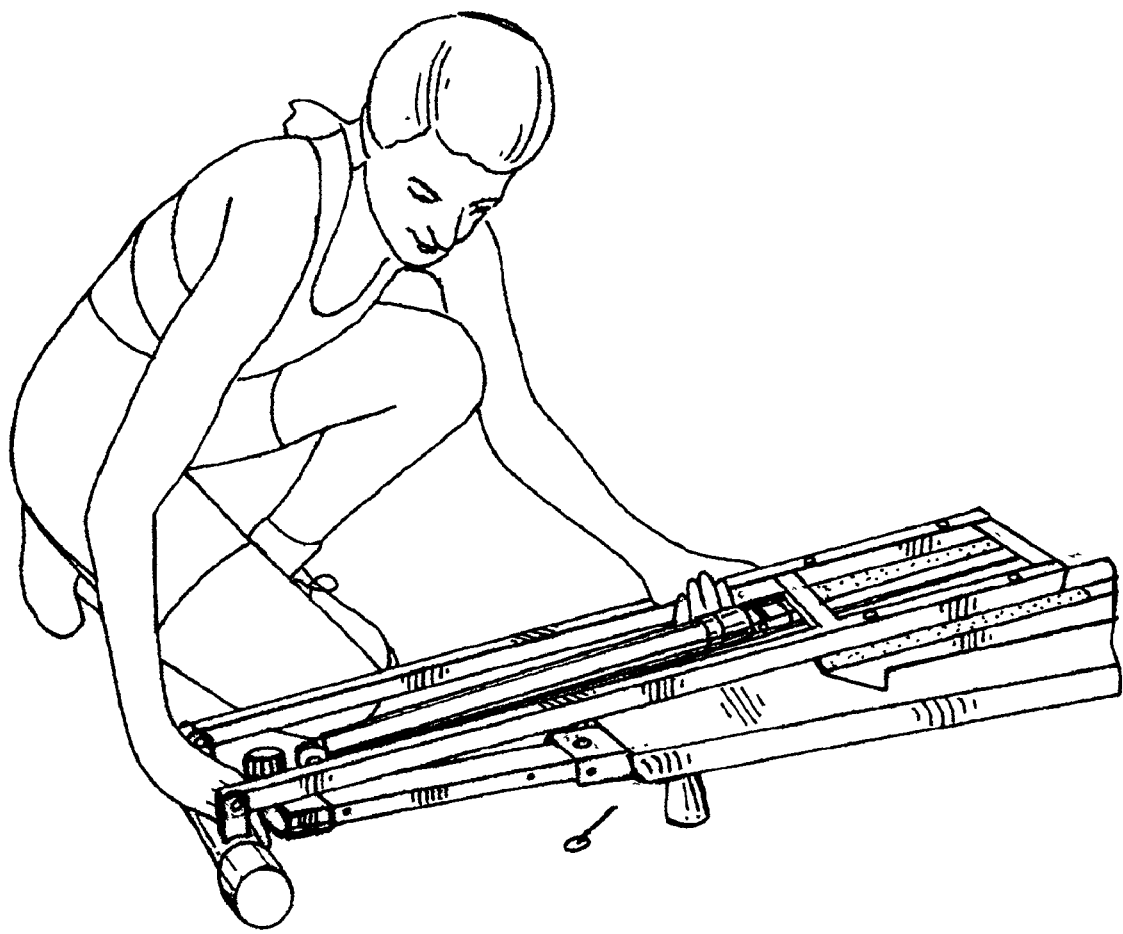
FIG. 8 illustrates the exercise device of FIG. 1 folded into a partially collapsed configuration prior to storing it.

FIG. 8 illustrates the folding of the exercise device into the collapsed configuration where it is suitable for storing. Locking knob 32 is loosened and foot pedal assembly 40 is slid to lower pedal plate 46 against pad 12. Detent pin 28 is removed and telescoping leg 22 is retracted by sliding extendable leg portion 26 into leg receiving portion 24. The other end of exercise device 12 is lifted and the device can be rolled on roller means 35 to a storage area.

FIGS. 9 is an illustration of an alternative embodiment of the exercise device 10. In this embodiment leg means 22 is comprised of a pair of parallel rails 50 extending from the end of pad 12. Rails 50 are elevated at their distal end as shown to provide a different characteristic opposing force for the various exercises compared to the embodiment shown in FIGS. 1 through 8. In FIG. 9 and the detail in FIG. 10 foot pedal assembly 40 can be seen to have a single plate 52 which is pivotally attached to a cross bar between a pair of frame members 54. Plate 52 can be locked into a "short" lever arm position as shown in FIG. 9 or into a "longer" lever arm position as shown in FIG. 10 to allow another way to alter the resistance force characteristics of the exercise device 12 to provide additional options for a variety of user preferences.

Additionally, it can be seen from FIG. 10 that the pedal plate 52 of this embodiment has a pair of exposed rail fittings 56 which can serve as hand grips to allow the user to perform a series of upper body exercises using the device 12.

In the configuration of the device shown in FIGS. 9 and 10 the resistance device 34 is pivotally connected at one end to the center of the end of the base pad 12 and the other end is connected to crossbar 54 between the side rails of foot pedal assembly 40. As can be seen, the pivotal mounting of the pedal plate 52 allows it to be positioned for some exercises above the point of connection with the resistance device 34 and for other configurations as shown in FIG. 10 with the plate 52 below the point of connection.

FIG. 11 shows another alternative embodiment of the exercise device 10. Leg means 22 is a single leg portion hinged to the front of pad 12 so that it can be folded under when the device is not in use. The other end of leg means 22 somewhat in the manner as illustrated for the double leg embodiment illustrated in FIGS. 9 and 10.

In FIG. 11 one end of the resistance device 34 is pivotally connected to the front of pad 12 and the other end is pivotally connected to a point on foot pedal assembly 40 as shown. There are two pedal plates 56 provided and they have rails projecting out around them for serving as hand grips to allow the exercise device 10 to be used for upper body exercises as well.

Although the present invention has been described here with reference to preferred embodiments, workers skilled in the art will recognize that changes may be made in form and detail without departing from the spirit and scope of the invention.

I claim:
1. An exercise device comprising, in combination:
 (a) a generally planar, base pad configured and arranged for supporting a prone user on a horizontal upper surface thereof;
 (b) an elongate, tubular first linear member secured lengthwise of the undersurface of the base pad and projecting one free longitudinal end partially from one transverse edge of the base pad;
 (c) a second elongate linear member configured to be telescopically engage with the first linear tubular member, and to extend a variable length outward from the free longitudinal end of the first linear member;
 (d) a transversely-positioned rigid bar member secured centrally to the outer free end of the second linear member and provided with a pair of roller means, rotatably mounted on the outer ends of the bar member;
 (e) an elongate, generally rectangular rigid frame member secured pivotally at its lower longitudinal end upon the rigid bar member so as to have arcuate reciprocal movement while the device is in use;
 (f) a dual foot pedal assembly secured on an inward surface proximal to the upper longitudinal end of the frame member and adapted to be contacted by the feet of a prone device user; and
 (g) a rigid elongate, force-resistance damper means, secured pivotally at its upper longitudinal end to the rigid frame member at a point intermediate of its longitudinal ends and below the foot pedal assembly, and secured pivotally at its lower longitudinal end to the upper surface of the first linear tubular member, so that upon the user exertion of force upon the foot pedal assembly, such exertion causes a yielding counter force from the damper means during the period of user exertion.

2. The invention of claim 1 wherein the planar base pad includes an integral plurality of dependent feet for elevating the pad somewhat above the surface of the supporting floor.

3. The invention of claim 1 wherein the lower ends of the frame member includes two parallel, longitudinally extending, frame member lateral segments which are connected to a pair of pivot points each being a clevis, located on the transverse rigid bar member.

4. The invention of claim 3, wherein the foot pedal assembly comprises a single planar surface which is pivotally attached to a transverse member located between the lateral segments of the elongate frame member.

5. The invention of claim 1 wherein said damper means is configured to be movable relative to the distal transverse bar member so as to provide different resistance levels to the user, by providing adjustable lengths for the arcuate lever arm comprised of the frame member and the foot engaging pedals mounted thereupon.

6. The invention of claim 1 wherein the linear members are configured for altering the acute angle of the damper means relative to the frame member so to vary the amount of force required by the user to move the pedal assembly mounted means thereon with at least one foot, while the user is supported by the pad.

7. The invention of claim 6 wherein the linear provided for altering the angle of the tubular body of the resistance means relative to the frame of the foot pedal assembly further comprises an adjustable pivotal connection between the frame member containing the foot pedal assembly and the first tubular linear member.

8. The invention of claim 1 wherein the damper means comprises a viscous including a tubular body which provides a damping force as the tubular body of the resistance means damper is being extended by a force applied by a user.

9. An exercise device comprising, in combination:
 (a) a generally planar base pad constructed and arranged for supporting a device user on an upper surface thereof;
 (b) an elongate first rigid leg means having one longitudinal end thereof attached to one transverse edge of said pad;
 (c) a second rigid leg means configured to slidingly engage the first leg means, with the locking member configured for locking at varying distances from one free end of the rigid elongate leg;
 (d) roller means mounted at the outer end of the second rigid leg means, and having at least one cross bar attached to the outer end of the second rigid leg means for supporting at least one floor roller means on at least one end thereof;
 (e) the elongate, generally rectangular rigid frame member secured pivotally at its upper longitudinal end upon the bar member cross, so as to have arcuate reciprocal movement while the device is in use;

(f) a foot pedal assembly secured proximal to the upper longitudinal end of the rigid frame member and being pivotally mounted thereon and comprising at least one foot engaging pedal; and (g) an elongate resistance damper means to provide a counter force to the physical force exerted upon the foot pedal assembly, said damper means having two longitudinal ends, with one upper end pivotally connected to a pivot point intermediate the foot pedal assembly proximal to the pedals thereof, and the lower end of the damper means being pivotally connected to the inner longitudinal end of the first rigid leg means.

* * * * *